United States Patent [19]
Boisture

[11] Patent Number: 5,588,593
[45] Date of Patent: Dec. 31, 1996

[54] SAFETY APPARATUS FOR HIGH PRESSURE LIQUID JET SYSTEM

[75] Inventor: Thomas B. Boisture, Baytown, Tex.

[73] Assignee: C.H. Heist Corp, Baytown, Tex.

[21] Appl. No.: 464,958

[22] Filed: Jun. 5, 1995

[51] Int. Cl.⁶ .............................. B05B 1/02; B05B 15/00; B26F 3/00
[52] U.S. Cl. .................. 239/67; 239/274; 239/526; 83/177
[58] Field of Search ................................ 239/67, 99, 274, 239/526, 569; 307/116; 83/177, 372, 370, DIG. 1

[56] References Cited

U.S. PATENT DOCUMENTS

| | | | |
|---|---|---|---|
| 3,885,739 | 5/1975 | Tuttle | 239/124 |
| 3,953,770 | 4/1976 | Hayashi | 317/146 |
| 4,216,911 | 8/1980 | Huperz et al. | 239/526 |
| 4,391,620 | 7/1983 | Geisel | 239/274 X |
| 4,395,641 | 7/1983 | Dise | 307/116 |
| 4,553,040 | 11/1985 | Truper et al. | 307/116 |
| 4,784,330 | 11/1988 | Hammelmann | 239/526 |
| 4,802,313 | 2/1989 | Smith | 239/526 X |
| 4,814,632 | 3/1989 | Glaeser et al. | 307/116 |
| 4,893,027 | 1/1990 | Kammerer et al. | 307/116 |
| 4,914,721 | 4/1990 | Glaeser et al. | 307/116 |
| 4,920,281 | 4/1990 | Harris | 307/308 |
| 5,249,612 | 10/1993 | Parks et al. | 141/219 |

*Primary Examiner*—Lesley D. Morris
*Attorney, Agent, or Firm*—Pravel, Hewitt, Kimball & Krieger

[57] ABSTRACT

A safety apparatus for use in a hydrocutting or hydroblasting system which has a normally closed shutoff valve for coupling a high pressure water source to a hydrocutting or hydroblasting gun. The shutoff valve is controlled by a solenoid valve coupled between an air-to-open (ATO) input of the shutoff valve and an air power source. A normally open inductive proximity switch, through a relay circuit, provides a control signal to the solenoid valve. The inductive proximity switch is located near a cutting or cleaning nozzle of the gun. When the inductive proximity switch comes in close proximity of a metal object to be cleaned or cut, the proximity switch closes, thereby opening the solenoid valve and the shutoff valve. When the gun is removed from the physical proximity of the metal, the inductive proximity switch opens, thereby turning off the shutoff valve.

17 Claims, 5 Drawing Sheets

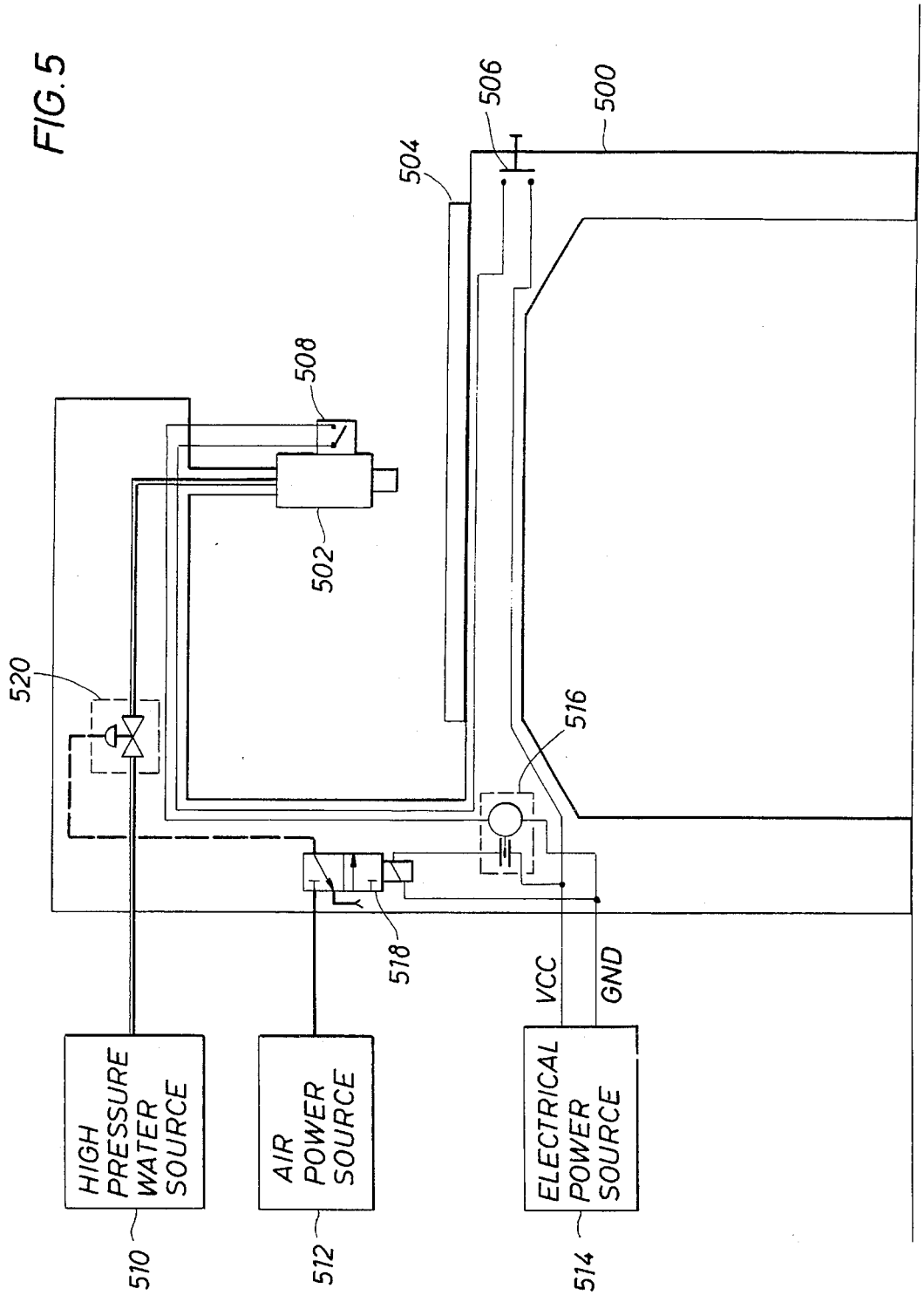

SAFETY APPARATUS FOR HIGH PRESSURE LIQUID JET SYSTEM

BACKGROUND OF THE INVENTION

1. Field of the Invention

The present invention relates to a safety apparatus for use in a high pressure liquid jet system used to clean or cut a metallic structure and more particularly to an inductive proximity switch which ensures nonoperation of the liquid jet system unless an output nozzle of the system is in the physical proximity of the metallic structure to be cut or cleaned.

2. Description of the Related Art

The use of a liquid, such as water, under high pressure to cut or clean metal has widespread industrial applications. Such as the case in hydroblasting in which water is exerted at a force of 6,000–20,000 p.s.i. in order to clean most metallic industrial equipment, such as heat exchangers. Because of the need for portability, the hydroblasting equipment normally includes a handheld hydroblasting gun coupled to a high pressure water source. The hydroblasting gun typically has at least one trigger lever which a human operator depresses in order to eject high pressure water from a nozzle of the gun.

A primary goal for the designers of hydroblasting equipment is to reduce the chance of harm occurring due to human operator error. Because the exiting water exerts a force of 6,000–20,000 p.s.i., the output of the hydroblasting gun can inflict severe injuries if the exiting water comes in contact with a human. The danger can be more readily appreciated given that at a force of 40,000 p.s.i., a jet of water can cut through metal. Thus, safety mechanisms have been developed to reduce the possibility of someone inadvertently turning on the hydroblasting gun.

A typical hydroblasting gun consists of a trigger lever provided to turn on and off a shutoff valve or dump valve which is coupled to the high pressure water source, thereby preventing a high pressure jet of water from accidentally exiting the nozzle. Several hydroblasting guns have been developed with safety mechanisms to ensure that this valve is not turned on by the inadvertent depression of the trigger lever when the hydroblasting gun is not being used to clean. Such a safety mechanism is disclosed in U.S. Pat. No. 4,216,911 entitled "High-Pressure Liquid-Jet Gun," Aug. 12, 1980. A high pressure hydroblasting gun is disclosed in which, in addition to the normal trigger lever located on the handle of the gun, a safety lever is located on the barrel of the gun, thereby requiring the operator to engage the safety lever on the barrel with one hand and the trigger lever with the other hand. This reduces the possibility of the operator inadvertently turning on the gun because both hands must be properly holding the gun in the normal cleaning position in order to turn on the gun. Another such dual trigger mechanism is disclosed in U.S. Pat. No. 4,784,330 entitled "High-pressure Spraying Gun," Nov. 15, 1988. A high pressure spraying gun is disclosed which has two handles with trigger levers on each handle which necessarily requires both hands to grip the gun in order to turn on the gun. Yet another type of safety device to be employed in a hydroblasting gun system is disclosed in U.S. Pat. No. 4,814,632 entitled "Safety Device," Mar. 21, 1989, and U.S. Pat. No. 4,914,721 entitled "Safety Device," Apr. 3, 1990. In these disclosures, a sensor is employed which senses if the operator has properly gripped the hydroblasting device, thereby reducing the risk of accidentally turning on the gun.

Although the prior art discloses systems for reducing the possibility of someone inadvertently turning on the hydroblasting gun, it still does not ensure that the hydroblasting gun will only be turned on when the gun is pointed at the metal structure to be cleaned. Because of the high recoil and weight of these guns, the chance of human operator error increases with the time of operation. Thus, a safety system is desired which inhibits operation of the hydroblasting gun unless the hydroblasting gun is directed toward the metal structure, thereby ensuring safety to the operator and all other humans who may be present. Furthermore, such a safety system could also be employed in a hydrocutting system to ensure the hydrocutter only turns on when the metal to be cut comes within the physical proximity of a nozzle of the hydrocutter.

SUMMARY OF THE INVENTION

The present invention relates to a safety apparatus for use in a high pressure fluid jet system used to cut or clean a metallic structure. The safety apparatus includes an inductive proximity switch located near an output nozzle of the fluid jet system which disables the system until the nozzles come within the physical proximity of the metallic structure to be cut or cleaned. The inductive proximity switch is coupled to a valve system common to all hydroblasting and hydrocutting equipment as known to those skilled in the art. The valve system is coupled between a high pressure water source which supplies the fluid jet system and the nozzle, thereby providing control of the exiting fluid.

The preferred embodiment relates to a hydroblasting system having a normally open inductive proximity switch and two normally open trigger switches which prevent the inadvertent use of the hydroblasting system. The hydroblasting system includes a hydroblasting gun and a normally closed valve having a flowthrough path coupled between a high pressure water source and a nozzle of the hydroblasting gun. The opening and closing of the flowthrough path of the high pressure valve is controlled through an air-to-open (ATO) input of the high pressure valve which is coupled to an air power source. When air pressure supplied by the air power source reaches the ATO input, the high pressure valve opens, thereby enabling operations of the hydroblasting gun. A solenoid valve coupled between the air power source and the ATO input of the high pressure valve is used to control the assertion and nonassertion of the air pressure.

In the preferred embodiment, both the trigger switches and the inductive proximity switch provide signals to the solenoid valve. All switches must be closed in order to open the solenoid valve. When the solenoid valve opens, the high pressure valve opens. Thus, operation of the hydroblasting gun is prevented unless the nozzle is within the physical proximity of the metallic structure, and the operator has depressed the trigger switches.

BRIEF DESCRIPTION OF THE DRAWINGS

A better understanding of the present invention can be obtained when the following detailed description of the preferred embodiment is considered in conjunction with the following drawings, in which:

FIG. 5 is an illustration of a hydrocutting table 500 incorporating the present invention.

DETAILED DESCRIPTION OF PREFERRED EMBODIMENT

Figure 1:
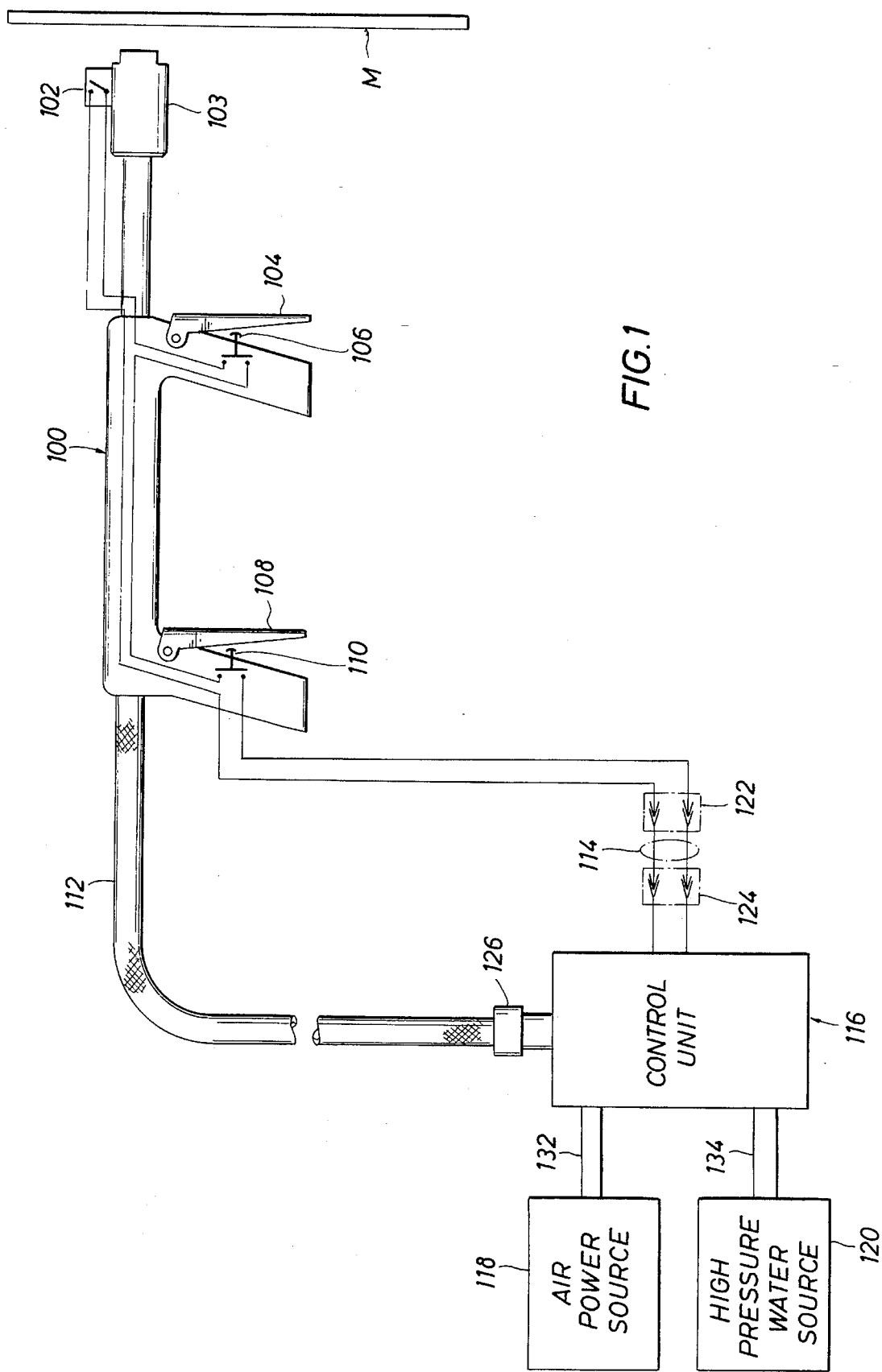
FIG. 1 is an illustration of hydroblasting gun 100 incorporating the present invention.

FIG. 1 illustrates the environment for the preferred embodiment. Shown in FIG. 1 is a hydroblasting gun 100 which has an inductive proximity switch 102 connected near a nozzle 103. High pressure water is supplied to gun 100 through a hose 112. A trigger lever 108 and a trigger lever 104 must be depressed by an operator to enable operations of gun 100. Normally open switches 106 and 110 are activated by these levers. Thus, as seen from FIG. 1, the circuit consisting of switch 110, switch 106 and proximity switch 102 must be closed to turn on gun 100. In the preferred embodiment, switch 102 is a normally open inductive proximity sensor, such as part no. Ni40U-CP40-VP4X2 manufactured by Turck of Minneapolis, Minn.. Switch 102 is closed when switch 102 is placed within the physical proximity of a metal structure M.

Also shown in FIG. 1 is a typical control unit 116 for hydroblasting gun 100. Hose 112 is connected to control unit 116 through a connector 126. When gun 100 is operational, control unit 116 supplies water to hose 112 from a high pressure water source 120. An air power source 118 supplies the necessary pressure to control a shutoff valve 216 (shown in FIG. 2). Source 118 could alternatively be a hydraulic source. A control cable 114 provides a conduit for the electrical connections of control unit 116 to gun 100. Control unit 116 is connected to control cable 114 through a connector 124, and gun 100 is connected to control cable 114 through a connector 122.

Figure 2:
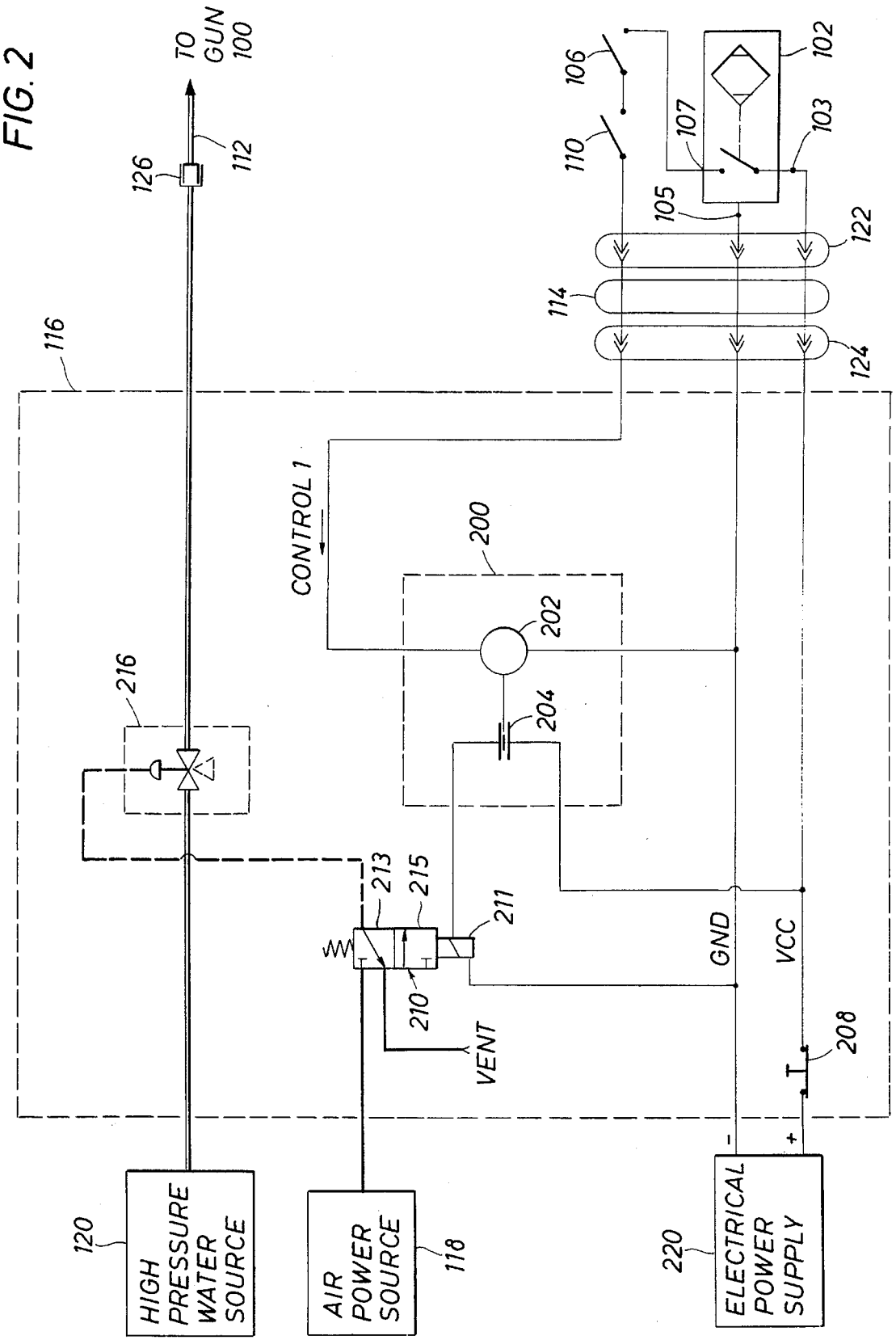
FIG. 2 is a block diagram of the preferred embodiment of the present invention.

Shown in FIG. 2 is a block diagram illustrating the preferred embodiment. Shown in FIG. 2 is the high pressure water source 120, the air power source 118, and the inductive proximity switch 102. Also shown in FIG. 2 is an electric power supply 220 which supplies the necessary electrical power for the preferred embodiment.

Shown in FIG. 2 is a shutoff valve 216 having a flowthrough path 217 and an air-to-open (ATO) input to open the flowthrough path 217. Alternatively, if source 118 were a hydraulic power source, valve 216 would have a hydraulic-to-open (HTO) input. The flowthrough path 217 of valve 216 is coupled between the high pressure water source 120 and the gun 100. Shutoff valve 216 provides the necessary means to connect or disconnect the gun 100 from the high pressure water source 120. In the preferred embodiment, source 120 has an intensifier to produce a high pressure output. Source 120 contains a sensor which senses when shutoff valve 216 has turned off and subsequently turns off the output of source 120 when this occurs. The fluid flowthrough path 217 of valve 216 from water source 120 to gun 100 is normally closed, thereby inhibiting any water flowing from high pressure water source 120 to gun 100.

In an alternative embodiment where source 120 is a lower pressure source without an intensifier and sensor, valve 216 includes a dump valve 218 to redirect instead of shutoff the flow of water from source 120. Because the conduit provided by the dump valve 218 is larger than the one provided by the flowthrough path 217, the water from source 120 exits the dump valve 218 at a low pressure when the dump valve 218 is open. In this alternative embodiment, the normally open dump valve 218 of valve 216 allows the water from source 120 to flow through dump valve 218 instead of through flowthough path 217. The dump valve 218 is closed when pressure from source 118 is exerted on the ATO input of valve 216. Thus, if no pressure provided by source 118 is exerted on the ATO input of valve 216, the water from source 120 exits the dump valve 218 at a low pressure, thereby allowing the water from source 120 to fall harmlessly to the ground. When pressure from source 118 closes dump valve 218, the water from source 120 is then redirected through flowthrough path 217, thereby enabling operations of gun 100.

Now referring back to the preferred embodiment, air power source 118 supplies the necessary pressure to close the fluid flowthrough path 217 of valve 216, thereby enabling the operation of gun 100. As shown in FIG. 2, a solenoid valve 210 is coupled between the ATO input of valve 216 and power source 118, thereby controlling the assertion of air pressure on the ATO input of valve 216. Solenoid valve 210 has two chambers 213 and 215. Chamber 213 provides a means to vent the ATO input of valve 216 and a shutoff for power source 118. This arrangement allows valve 216 to quickly close when power source 118 is shutoff from the ATO input. Chamber 215 provides a flowthrough path to couple power source 118 to the ATO input of valve 216. Solenoid valve 210 is normally closed; therefore, chamber 213 is normally coupled between power source 118 and the ATO input of valve 216. When valve 216 is opened, chamber 215 is coupled between power source 118 and the ATO input of valve 216. Solenoid valve 210 includes an electrical solenoid 211 which is used to physically move chamber 213 and chamber 215 to open the normally closed valve 210. Thus, in the preferred embodiment, valve 210 provides the necessary electromechanical link necessary for inductive proximity switch 102, switch 110 and switch 106 to control valve 216.

Referring to the electrical connections included in the preferred embodiment as shown in FIG. 2, electrical power supply 220 supplies a supply voltage, $V_{CC}$. A power switch 208, coupled in series between the positive terminal of the power supply 220 and the $V_{CC}$ signal, provides an additional safety measure to ensure no inadvertent turn on of gun 100. A relay 200 is provided which has an input winding 202 that controls a relay switch 204. Winding 202 has one end connected to ground, and the other end of winding 202 is connected to one end of switch 110. The other end of switch 110 is connected to one end of switch 106, and the other end of switch 106 is connected to one end of proximity switch 102. The other end of proximity switch 102 is connected to $V_{CC}$. Relay 200 enables a low power circuit, including switch 110, switch 106 and switch 102, to control a typically higher power circuit including solenoid 211. One terminal of solenoid 211 is connected to ground, and relay switch 204 is coupled in series between another terminal of solenoid 211 and the $V_{CC}$ signal. Thus, relay 200 controls the current that flows through solenoid 211, thereby controlling the opening and closing of valve 210. A CONTROL1 current signal provided by the series connection of switch 110, switch 106 and switch 102, flows through input winding 202, thereby controlling the closing or opening of valve 216. When the CONTROL1 current signal is asserted, valves 210 and 216 are opened, thereby coupling high pressure water source 120 to gun 100. When the CONTROL1 current signal is negated, valves 210 and 216 are closed. Thus, as can be seen from FIG. 2, to assert the CONTROL1 current signal and turn on valve 216, the series circuit including winding 202 must form a closed circuit. As can be seen from FIG. 2, proximity switch 102, switch 106 and switch 110 are all connected in series with winding 202. Thus, all of the switches must be closed to ensure operation of gun 100.

Still referring to FIG. 2, proximity switch 102 has a supply voltage terminal 103 coupled to the $V_{CC}$ supply voltage; a series switched path, which includes terminal 107 and terminal 103, coupled in series with switch 106, switch 110 and winding 202; and a ground terminal 105. Thus, if gun 100 is removed from the physical proximity of the metal structure M, lever 104 is released, or lever 108 is released, valve 216 is opened, thereby disconnecting high pressure water source 120 from gun 100 and preventing the operation of gun 100. In the preferred embodiment, the inductive proximity switch 102, which is normally open, closes when the proximity switch 102 is within 40 mm of the metal structure.

As previously mentioned, to turn on gun 100 in the preferred embodiment, both levers 104 and 108 must be depressed while inductive proximity switch 102 is within the physical proximity of the metal structure M. However, once operations have commenced, it may be desirable to have a safety apparatus which does not require gun 100 to remain within the close physical proximity of metal structure M. Thus, once gun 100 is turned on, it is desirable for gun 100 to remain operational as long as both levers 104 and 108 are depressed, thereby not requiring inductive switch 102 to remain within the physical proximity of metal structure M. Shown in FIG. 3 is an alternative embodiment to accomplish such a result.

Figure 3:
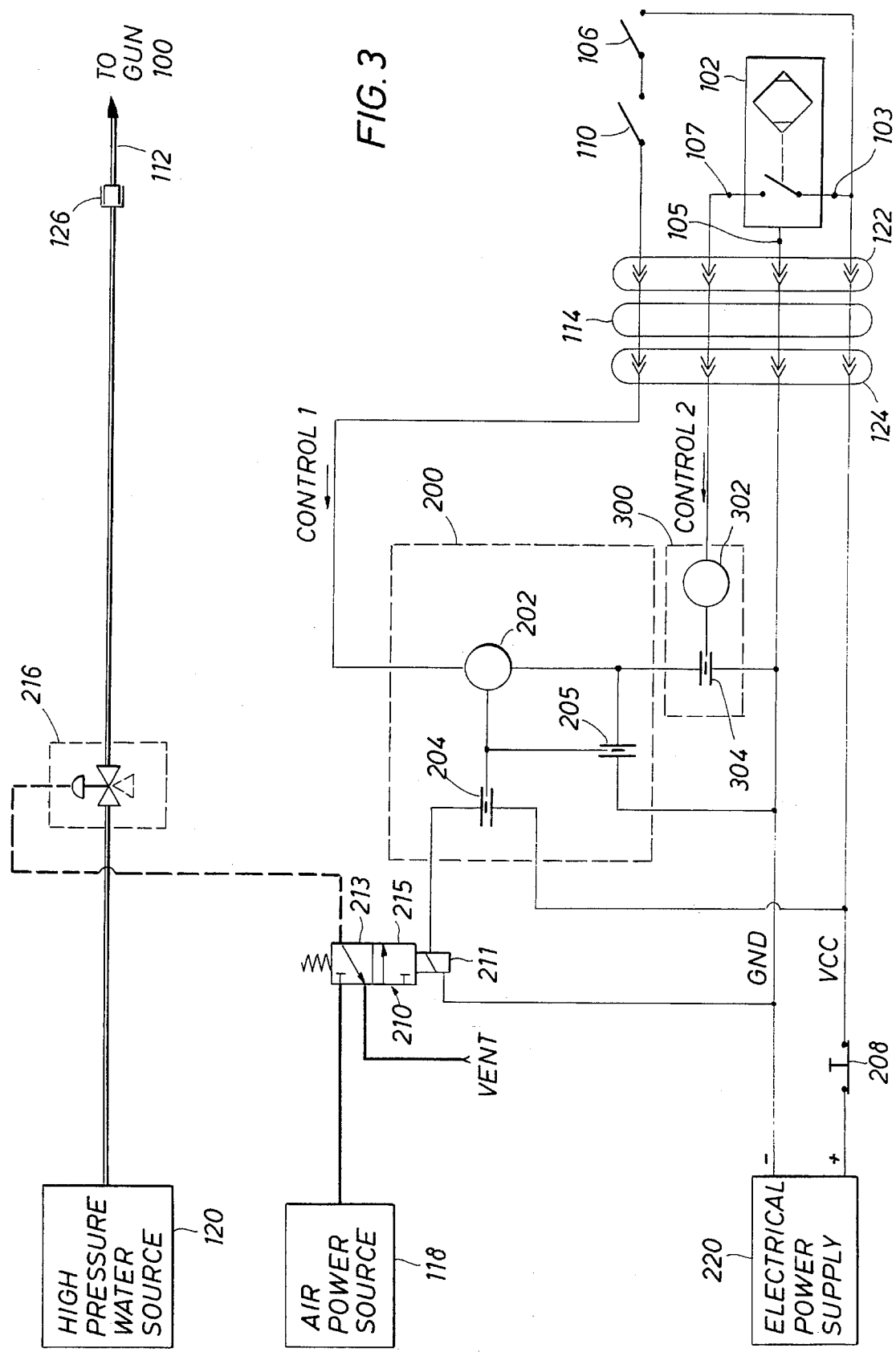
FIG. 3 is a block diagram of an alternative embodiment of the present invention.

Referring now to FIG. 3, this alternative embodiment is accomplished through the addition of an additional relay 300 and the use of an additional relay switch 205 of relay 200. Relay 300 includes a winding 302 which is controlled by a CONTROL2 current signal. Winding 302 is coupled between ground and terminal 107. Winding 302 controls the opening and closing of a relay switch 304 which is inserted in series between winding 202 and ground. In this alternative embodiment, one end of switch 106 is connected to one end of switch 110, and the other end of switch 106 is connected to $V_{CC}$ instead of terminal 107. Relay switch 205, which is controlled by winding 202, opens and closes concurrently with relay switch 204. Relay switch 205 is connected in parallel with relay switch 304. This arrangement ensures that once lever 104 and lever 108 are depressed and the gun 100 is in the physical proximity of the metal structure M, the gun 100 can then be removed from the immediate proximity of the metal structure M and remain operational as long as both levers 104 and 108 remain depressed.

The operation of the alternate embodiment shown in FIG. 3 is as follows. Relay switch 304 remains closed as long as the CONTROL2 current signal is asserted. Before switches 110 and 106 are turned on by depressing levers 108 and 104, respectively, both the CONTROL1 current signal and the CONTROL2 current signal are negated. Until otherwise noted, it is now assumed that the operator has closed switches 110 and 106. When the operator then moves the gun 100 in front of the metal structure M and proximity switch 102 closes, the current signal CONTROL2 is asserted, thereby turning on relay switch 304. Thus, the CONTROL1 current signal is also asserted, thereby turning on relay switch 204 which, as described above, opens valve 216. Relay switch 205 also closes when CONTROL1 is asserted, thereby creating an alternative current path to the one created by relay switch 304.

When gun 100 is removed from the metal structure M, proximity switch 102 opens. In the preferred embodiment this would cause valve 216 to close, thereby disconnecting high pressure water source 120 from gun 100; however, in the alternative embodiment, when proximity switch 102 is subsequently opened, the CONTROL1 current signal is still asserted because of relay switch 205. When the CONTROL2 current signal is negated, however, relay switch 205 keeps the CONTROL1 current signal asserted. Thus, the CONTROL1 current signal will remain asserted, thereby keeping valve 216 open as long as both switch 110 and switch 106 remain closed. Once either switch 106 or switch 110 is opened, the CONTROL1 current signal is negated; valve 216 closes; and switch 110, switch 106 and switch 102 must all be closed in order to subsequently open valve 216.

Figure 4:
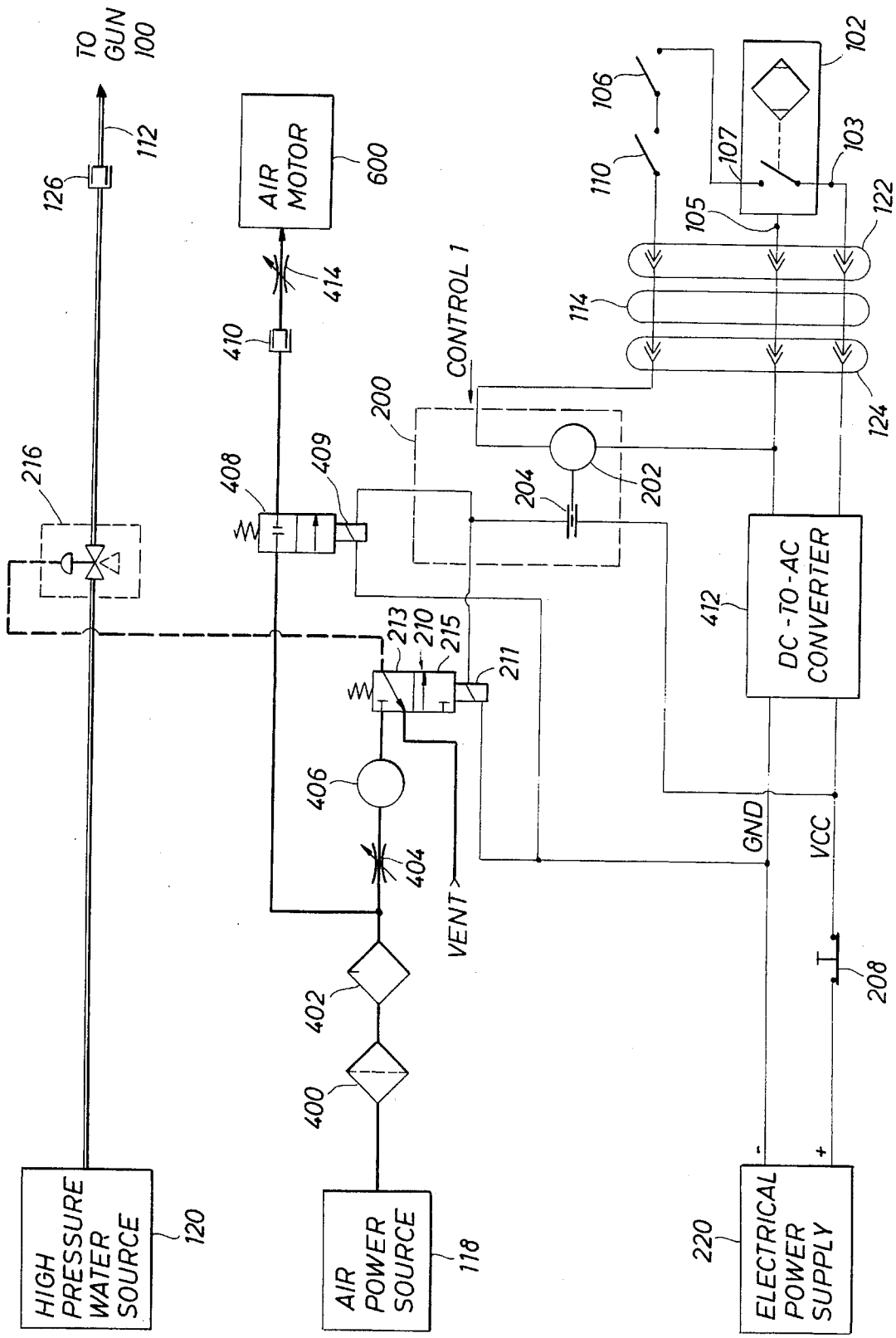
FIG. 4 is a more detailed block diagram of the preferred embodiment of the present invention.

FIG. 4 illustrates a more detailed block diagram of the preferred embodiment. Shown in FIG. 4 is a DC-to-DC converter 412 coupled between the electrical power supply 220 and one end of terminal 105 and terminal 103. In the preferred embodiment, power supply 220 provides 24 volts DC which is the voltage typically provided by portable generators used with hydroblasting equipment. Converter 412 ensures a supply voltage for proximity switch 102 and relay 200 which does not exceed their maximum rating. In the preferred embodiment, the output of converter 412 is 10 volts DC.

Also shown in FIG. 4, is an air filter 400 having one side coupled to the air power source 118, and the other end of filter 400 is connected to one side of a lubricator 402. The other side of lubricator 402 is connected to a solenoid valve 408 and one side of a flow control valve 404. Solenoid valve 408 has its other side connected it a connector 410. Solenoid valve 408 is controlled by a solenoid 409. The other side of connector 410 is connected to one end of a flow control valve 414. The other end of flow control valve 414 is connected to an air motor 600 on gun 100. The other side of flow control valve 404 is connected to one side of a pressure regulator 406. The other side of pressure regulator 406 is connected to one side of valve 210.

In the preferred embodiment, an air motor 600 on gun 100 rotates nozzle 103. The preferred embodiment ensures the air motor 600 is not turned on unless valve 216 is open. Filter 400 provides filtering for the air source 118. Lubricator 402 provides lubrication for the air motor 600. In an alternative embodiment, lubricator 402 would be unnecessary if power source 118 were a hydraulic source. Flow control valve 404 ensures no "banging" will occur in the air lines supplied by source 118. Air pressure regulator 406 ensures a sufficient pressure to properly operate valve 216. Solenoid valve 408 has a solenoid 409 electrically coupled in parallel with solenoid 211; therefore, valve 210 is concurrently turned on and off with valve 409. This ensures that air motor 600 will not be turned on unless the gun 100 is turned on.

The embodiments are not limited to hydroblasting equipment. Alternatively, the safety apparatus described above could apply to a hydrocutting system. Referring now to FIG. 5, this alternative embodiment includes a stationary cutting table 500. A nozzle 502 for emitting high pressure water is mounted above the surface of the table 500. A piece of metal 504 to be cut is placed on the surface of the table by the operator. Normally the operator would depress a normally open trigger switch 506 in order to begin cutting operations; however, this alternative embodiment ensures no water will be emitted from the nozzle 502 until the metal 504 is under the nozzle 502. A normally open inductive proximity switch 508 is mounted on the nozzle 502 which closes when the proximity switch 508 is within the physical proximity of the metal 504.

The valve system in this alternative embodiment is similar to the one described in the preferred embodiment. Both the trigger 506 and the inductive proximity 508 switches provide electrical signals to a normally closed solenoid valve 518 through a relay 516. The solenoid valve 518 is coupled between an air power source 512 and an air-to-open (ATO) input of a normally closed high pressure shutoff valve 520. The high pressure shutoff valve 520 has a flowthrough path 521 coupled between a high pressure water source 510 and the nozzle 502. The operation of this alternative embodiment is similar to the operation of the preferred embodiment. Only when both the inductive proximity 508 and the trigger 506 switches are closed will water be emitted from the nozzle 502. Thus, this alternative embodiment ensures that the hydrocutting system will not be inadvertently turned on.

The foregoing disclosure and description of the invention are illustrated and explanatory thereof, and various changes in the size, shape, materials, components, circuit elements, wiring connection and contacts as well as in the details of the illustrated circuitry and construction may be made without departing from the spirit and scope of the invention.

What is claimed is:

1. A safety apparatus for use in a high pressure fluid jet system for operation by an operator, said fluid jet system includes a high pressure fluid source for supplying fluid, a nozzle for ejecting said fluid, and an electrically operated valve having an on-off flowthrough path, said flowthrough path coupled between said high pressure fluid source and said nozzle, said safety apparatus comprising:

a trigger switch operable by the operator of the high pressure fluid jet system and a proximity switch located near the nozzle for indicating when said proximity switch is within a first distance of a structure to be operated on by the high pressure fluid jet system, said trigger switch and said proximity switch connected to the valve to operate the valve when said trigger switch is operated by the operator and said proximity switch indicates proximity to the structure at a concurrent time.

2. The safety apparatus of claim 1, wherein said proximity switch is an inductive proximity switch.

3. The safety apparatus of claim 1, wherein said first distance is 40 millimeters.

4. The safety apparatus of claim 1, wherein said proximity switch indicates when said proximity switch is within said first distance of said structure when said structure is a metallic structure.

5. The safety apparatus of claim 1, wherein after said valve is operational said trigger switch sustains operation of said valve as long as said trigger switch is operated by the operator.

6. The safety apparatus of claim 1, wherein the operation of said valve includes turning on the flowthrough path of said valve.

7. A safety apparatus for use in a high pressure fluid jet system for operation by an operator, said fluid jet system includes a high pressure fluid source for supplying fluid, a nozzle for ejecting said fluid, and an electrically operated valve having an on-off flowthrough path, said flowthrough path coupled between said high pressure fluid source and said nozzle, said safety apparatus comprising:

a trigger switch operable by the operator of the high pressure fluid jet system and an inductive proximity switch located near the nozzle for indicating when said proximity switch is within a first distance of a structure to be operated on by the high pressure fluid jet system, said trigger switch and said proximity switch connected to the valve to operate the valve when said trigger switch is operated by the operator and said proximity switch indicates proximity to the structure at a concurrent time.

8. The safety apparatus of claim 7, wherein said first distance is 40 millimeters.

9. The safety apparatus of claim 7, wherein said proximity switch indicates when said proximity switch is within said first distance of said structure when said structure is a metallic structure.

10. The safety apparatus of claim 7, wherein after said valve is operational said trigger switch sustains operation of said valve as long as said trigger switch is operated by the operator.

11. The safety apparatus of claim 7, wherein the operation of said valve includes turning on the flowthrough path of said valve.

12. A high pressure fluid jet system for operation by an operator, said fluid jet system comprising:

a high pressure fluid source for supplying fluid;

a nozzle for ejecting said fluid;

an electrically operated valve having an on-off flowthrough path, said flowthrough path coupled between said high pressure fluid source and said nozzle; and a safety apparatus comprising:

a trigger switch operable by the operator of the high pressure fluid jet system; and a proximity switch located near the nozzle for indicating when said proximity switch is within a first distance of a structure to be operated on by the high pressure fluid jet system, wherein said trigger switch and said proximity switch are connected to the valve to operate the valve when said trigger switch is operated by the operator and said proximity switch indicates proximity to the structure at a concurrent time.

13. The fluid jet system of claims 12, wherein said proximity switch is an inductive proximity switch.

14. The fluid jet system of claims 12, wherein said first distance is 40 millimeters.

15. The fluid jet system of claims 12, wherein said proximity switch indicates when said proximity switch is within said first distance of said structure when said structure is a metallic structure.

16. The fluid jet system of claims 12, wherein after said valve is operational said trigger switch sustains operation of said valve as long as said trigger switch is operated by the operator.

17. The fluid jet system of claims 12, wherein the operation of said valve includes turning on the flowthrough path of said valve.

* * * * *